FIG. I

INVENTOR
WILLIAM F. AVERY
BY John C. LeTurno
ATTORNEY

United States Patent Office 3,422,005
Patented Jan. 14, 1969

---

3,422,005
ISOBARIC PROCESS FOR MOLECULAR SIEVE SEPARATION OF NORMAL PARAFFINS FROM HYDROCARBON MIXTURES
William F. Avery, Neuss (Rhine), Germany, assignor to Union Carbide Corporation, a corporation of New York
Continuation-in-part of application Ser. No. 396,279, Sept. 14, 1964. This application Nov. 8, 1967, Ser. No. 693,036
U.S. Cl. 208—310      6 Claims
Int. Cl. C10g 25/02

ABSTRACT OF THE DISCLOSURE

A constant pressure process for separating normal paraffins from a hydrocarbon vapor feed stream having 10 to 25 carbon atoms per molecule using normal hexane purge and zeolitic molecular sieve selective adsorbent.

CROSS REFERENCE TO RELATED APPLICATION

This application is a continuation-in-part of application Ser. No. 396,279 filed Sept. 14, 1964, in the name of W. F. Avery and now abandoned.

BACKGROUND OF THE INVENTION

This invention relates to a process for separating normal paraffins from a hydrocarbon vapor feed stream having 10 to 25 carbon atoms per molecule and containing normal paraffins and non-normal hydrocarbons by selective adsorption of the normals in a crystalline zeolitic molecular sieve material. The feed may contain either or both kerosene with 10 to 15 carbons or gas oil with 15 to 25 carbons.

Kerosene may be broadly defined as a hydrocarbon mixture having an initial boiling point according to the American Society of Testing Materials (ASTM) of about 275° F. and an ASTM final boiling point below 600° F. Kerosene contains between about 10 and 40 mol percent normal paraffins having 10 to 15 carbon atoms per molecule; these particular normal paraffins are used as raw materials for "biologically soft" detergents, industrial solvents and for the production of chlorinated petroleum waxes, lubricants, plasticizers, flame proofing agents and vegetable oils. The presence of non-normal hydrocarbons such as isomers and aromatics often have a detrimental effect on these products. Conversely isomer hydrocarbons having 10 to 15 carbon atoms per molecule as found in kerosene are used as jet fuel components and the presence of normal hydrocarbons adversely effects the freezing point of such fuels.

Gas oil may be broadly defined as a hydrocarbon mixture having an initial boiling point according to the ASTM of above 400° F. and an ASTM final boiling point below 700° F. Gas oil contains between about 10 and 40 mol percent normal paraffins having 16 to 25 carbon atoms; these particular normal paraffins are used as raw materials for the synthesis of proteins, plasticizers, and alcohols.

One commercially employed method for separating normal paraffins from kerosene vapor feed streams is urea adduction. This process is relatively complicated, unreliable and involves difficultly controlled chemical reactions. For these reasons the urea process is only used in extremely large size plants.

It is known that crystalline zeolitic molecular sieves may be used for selective adsorption of normal paraffins from admixtures with non-normals. One commercially used process involves the separation of normal paraffins having 5 through 9 carbon atoms per molecule from gasoline feed stock by selective adsorption of the normals in calcium zeolite A at temperatures of 660 to 850° F. at a superatmospheric pressure. The normals are desorbed by reducing the pressure in the molecular sieve bed to subatmospheric. It was found that high carbon content components such as coke accumulate at a relatively low rate in this temperature range as compared to lower temperatures such as 600° F.

In molecular sieve adsorption processes for separating gasoline feed stocks it is not necessary to employ externally supplied purge fluids because the relatively light normal paraffins are effectively desorbed by simple pressure reduction to a subatmospheric level. In contrast the normal paraffins found in kerosene and gas oil are more strongly adsorbed by molecular sieve materials and cannot be effectively desorbed by the simple pressure swing procedure. It is necessary to pass a purge fluid through the bed to substantially completely remove these heavier normal paraffins. Unfortunately the required quantities of purge fluids are so large that such fluids must be recovered from the normal paraffin-purge fluid mixture for recycling and reuse in subsequent desorption steps. The most effective method for separating such mixtures is fractional condensation, i.e., cooling the mixture sufficiently for condensation of the relatively high boiling normal paraffins leaving the lower boiling purge as an overhead component. When one attempts to employ the conventional pressure swing process for separating kerosene or gas oil vapor feed stocks the fractional condensation step must be performed at vacuum pressure. However, at such low pressures heat transfer coefficients become extremely low thereby necessitating enormous heat exchanges. Also special and expensive heat exchange designs are required for vacuum operation to minimize pressure drop.

An object of this invention is to provide an improved process for separating normal paraffins in a hydrocarbon vapor feed stream having 10 to 25 carbon atoms per molecule by selective adsorption in molecular sieve material. Another object is to provide such a process which permits efficient separation of the normal paraffins from the purge component with high heat transfer efficiency.

SUMMARY

These and other objects are accomplished in the present process which in one aspect comprises the steps of contacting the hydrocarbon vapor feed stream with a bed of zeolitic molecular sieve having pore size of about 5 angstroms at temperatures of between about 500° F. and 800° F. and at superatmospheric pressure between about 20 and 65 p.s.i.a. The normal paraffins are adsorbed in the bed and a first effluent stream substantially depleted of the normal paraffins but containing normal hexane purge component is withdrawn from the bed at the same superatmospheric pressure. Contact between the vapor feed stream and the molecular sieve bed is continued for a predetermined period. Thereafter normal hexane purge vapor is passed at the same superatmospheric pressure and the adsorption temperature through the bed in a direction countercurrent to the previously flowing vapor feed. A second effluent of desorbed normal paraffins and the normal hexane purge is discharged from the bed. The first effluent mixture is fractionated into a non-normal hydrocarbon bottoms component and a normal hexane overhead fraction. The second effluent is also but separately fractionated into a normal paraffin bottoms component and a normal hexane overhead component. Both of these normal hexane overhead components are recycled as at least part of the normal hexane purge vapor.

One important aspect of the present process is its substantially isobaric nature, that is, the pressures of the adsorption and desorption steps are substantially the same. By isobaric operation far higher heat transfer coefficients are possible in the fractional condensation step for separating the second effluent comprising normal hydrocarbons and normal hexane purge. This is in marked contrast to the low heat transfer coefficients which would be encountered in the commercially employed pressure swing cycle for separating hydrocarbon mixtures. Isobaric operation has many other important advantages over pressure swing processes. For example the equipment is exposed to a relatively small range of pressure variation hence less stress fatigue. Also drastic changes in the molecular sieve adsorbent beds are avoided; such changes are necessary in pressure swing processes and result in attrition of adsorbent pellets unless special and complicated precautions are used to change pressure in stages. Another significant advantage of the present isobaric process as compared to pressure swing processes is elimination of time required for depressurization and repressurization. This means that a relatively larger portion of the cycling time may be employed for both adsorbent feed gas contact and purge gas-adsorbent contact permitting relatively smaller beds for required production rates of normal paraffins and non-normal hydrocarbons. A further undesirable characteristic of pressure swing cycles avoided in the instant invention is the cooling effect of expanding gas which necessarily results in loss of heat in the adsorbent bed; such heat must be made up from an external source if a constant temperature level is to be maintained during desorption. In the present process the Joule-Thompson gas expansion effect is completely avoided. A further substantial advantage of this process is the use of relatively high pressures during each process step thereby minimizing the size of vessels, conduits and valves. For relatively large plants a pressure swing process would necessitate enormous vacuum valves which are not commercially available. Finally, this isobaric process eliminates the possibility of air inleak and the creation of an explosive mixture within the equipment.

A further advantage of this particular isobaric process as compared to a pressure swing process using n-hexane purging lies in the increased effectiveness of the latter as a desorbing medium for the normal paraffin adsorbate. It is of course true that any adsorbable material is more strongly held at higher pressures than at lower pressures. The adsorptivity of kerosene and gas oil normal paraffins in molecular sieves is slightly greater at 20 p.s.i.a. than at 0.5 p.s.i.a. However, the adsorptivity of n-hexane is greatly increased by raising the desorption pressure from 0.5 p.s.i.a. to 20 p.s.i.a. This means that its effectiveness in displacing the kerosene and gas oil normal paraffin adsorbate in a dynamic system is significantly enhanced.

The process of this invention is operable in a temperature range of 500° F. to 800° F., that is, both the adsorption and desorption steps are performed at substantially constant temperature within this range. However, it has been unexpectedly discovered that with kerosene feed far superior results are obtained in a temperature range of 575° F. to 675° F., and optimum performance is achieved in the range of 600° F. to 635° F. For gas oil feed, far superior results are obtained in a temperature range of 600° F. to 700° F.

In molecular sieve adsorption pressure swing processes for separating gasoline range hydrocarbons by selective adsorption of the normals, it has been found that the deactivation rate (loss of adsorptive capacity) is minimized if the adsorption-desorption temperature is relatively high, in the range of 660° F. to 850° F. Deactivation of molecular sieves is caused by the accumulation of non-volatile, high carbon content residues in the inner adsorption region and uniform sized sieve pores. These carbonaceous residues are not removed by purging and progressively reduce the molecular sieve's capacity for normal paraffins until continued operation is inefficient. At this point the deactivated bed is taken off-stream and reactivated by burn-off of the carbonaceous matter using controlled quantities of oxygen-containing gas as for example described in Mays U.S. Patent No. 3,069,362.

I have discovered that in contrast to the pressure swing-gasoline feedstock-molecular sieve selective adsorption process, minimum deactivation of molecular sieve material is achieved in this isobaric process with kerosene feedstock when the adsorption-desorption temperature is relatively low—between about 575° F. and 675° F. This is particularly surprising when one recognizes that kerosene feedstocks have significantly higher initial and final boiling points than gasoline feedstocks; the former's volatility is lower at a given temperature and one might logically conclude from the gasoline process experience that deactivation would be minimized at a still higher adsorption-desorption temperature.

This phenomenon was demonstrated in a series of pilot plant tests in which the same kerosene feedstock was contacted with a bed of calcium zeolite A at pressure of 25 p.s.i.a. followed by cocurrent n-hexane purge and then countercurrent n-hexane desorption purge. In one test the contact temperature was 725° F., the molar ratio of n-hexane desorption purge to kerosene feedstock normal paraffins was 25.5:1 for the first 3 days and then 22:1 for the next 3½ days. At the end of this period the kerosene normal paraffin capacity of the bed was about 58% of its original capacity. In another test the contact temperature was 575° F., the molar ratio of n-hexane desorption purge to kerosene feedstock normal paraffins was substantially lower—about 14.5:1. However, after 7½ days of continuous cycling the molecular sieve had not lost any of its adsorptive capacity.

The reasons for this temperature criticality are not fully understood, but believed due to the general effects of pressure and quantity of non-desorbed feedstock residue on deactivation rate. Higher pressures tend to reduce the deactivation rate whereas larger quantities of residue (or reactants) tend to increase the molecular sieve deactivation. It appears that the higher desorption pressures used in the present isobaric process decrease the deactivation rate more rapidly than the larger quantity of residue increases this deactivation rate, as compared to vacuum desorption.

Despite the unexpectedly lower deactivation rate at relatively low adsorption-desorption temperatures of 575° F.–675° F., one would logically assume that such temperatures would not be suitable because lower temperatures also entail larger purge rates. That is, the normal paraffin adsorbate is more strongly held by the molecular sieve material at these relatively low temperatures and more difficult to remove. The quantity of required purge is in turn proportional to the absolute pressure level. If one were to separate a kerosene vapor feed in the 575°–675° F. range in a pressure swing process, the larger required quantity of purge (due to the lower temperature level) would create a significant pressure gradient in the adsorption bed during the vacuum desorption step. That is, the pressure at the purge inlet end would be significantly greater than the pressure at the purge discharge end. This pressure gradient is a relatively large fraction of the absolute pressure to which the bed is exposed, due to the vacuum condition. Since the required purge volume is proportional to this fraction, the amount of purge would necessarily be increased an additional substantial amount to compensate for the pressure gradient.

At the higher isobaric desorption pressure level of the instant process, the increased effectiveness of the n-hexane as a desorbing agent eliminates the need for a larger amount of purge even though the adsorption-desorption temperature is relatively low. This lower temperature enhances the effectiveness of the n-hexane as a desorbing agent in the same manner as does the relatively high pressure of the desorption step.

Although a pressure gradient of about the same general magnitude exists in the bed during the desorption step of the instant process, this gradient is a relatively small fraction of the absolute pressure in the bed since this pressure is superatmospheric and in the range of 20–

65 p.s.i.a. The net result of this desorption pressure level-purge gas relationship is that a smaller quantity of purge gas is required in the relatively low adsorption-desorption temperature range of 575°–675° F. when the desorption pressure is the same superatmospheric pressure of the adsorption step, as compared to vacuum desorption.

Normal hexane is the purge-desorbing fluid used in this process. It represents as optimum single compound for both removal of the kerosene or gas oil normal paraffins from the molecular sieve and ease of separation from these normals as well as the non-normals and recycling for use in a subsequent desorption step. This compound may be separated from both the non-normal hydrocarbons and the normal paraffins of the kerosene or gas oil feed vapor by condensation at substantially the adsorption-desorption pressure using water as the coolant. If a lighter normal hydrocarbon such as n-butane or n-pentane were used for desorption, substantially higher pressure and/or low temperature refrigerants would be necessary to effect fractional condensation. On the other hand, use of heavier normal hydrocarbons such as n-heptane or n-octane significantly reduces the distillation driving force between the purge component and the kerosene or gas oil normal and non-normal hydrocarbons so that a substantially larger number of distillation trays would be needed to achieve the required degree of separation in the fractional condensation step.

As previously described, n-hexane is highly effective as a displacing fluid for kerosene normal paraffins at the desorption temperature range of 575°–675° F. and relatively high pressure range of 20–65 p.s.i.a., as contrasted with the prior art desorption conditions of 660°–850° F. and subatmospheric pressure. Lighter normal paraffins are less strongly held by molecular sieves hence less suitable for displacing the heavier adsorbate, whereas the heavier normals probably increase the rate of high carbon residue formation.

Another important advantage of this process is minimal degradation of the n-hexane desorbing medium. By conducting the adsorption-desorption at the relatively low temperature of 575–675° F., the amount of n-hexane cracking is reduced. This phenomenon was demonstrated by two pilot plant tests in which all parameters except temperature were identical. In one test the adsorption-desorption temperature was 725° F.; the amount of degradation progressively increased from zero and after 67 hours of continuous operation amounted to 2.5% of the desorbing medium. In the other test at 575° F., the degradation was only 0.3% after 67 hours of operation.

Degradation of the n-hexane desorbing medium is serious because the degradation products (lighter hydrocarbons) do not function as effective displacement means for removing the kerosene or gas oil normal paraffins from the molecular sieve bed. This was demonstrated in another series of pilot plant tests, at a particular purge rate the operating loading on the molecular sieve bed was reduced from 3.5 lbs. normal paraffins per 100 lbs. adsorbent to 2.7 lbs. normal paraffins when the normal hexane content of the purge medium degraded from 85% to 55%.

Although the invention and its advantages have been described in terms of a kerosene feed, they are equally applicable to gas oil feeds or mixtures of kerosene and gas oil. Moreover, the problems of cracking and rapid deactivation of the molecular sieve adsorbent become more serious with these heavier hydrocarbon feeds. This is because the cracking and deactivation rates increase with increasing molecular weights. With feedstocks containing gas oil, it is preferred to conduct the process at temperatures between about 600 and 700° F. as a balance between relatively high adsorbate loadings above 600° F. and minimum cracking below 700° F.

There is, however, a special problem associated with gas oil-containing feedstocks, that of conducting the process at temperatures not only above the dew point but also sufficiently high to avoid capillary condensation. These temperatures also increase with higher molecular weights. That is, the dew point and capillary condensation temperatures are higher for gas oil than kerosene feeds.

More specifically, the process temperature should be above the dew point of the hydrocarbon feed to avoid a two-phase mixture in the adsorbent beds. This is because the isomer condensate in the bed void space would not be completely removed during the purge desorption step and the normal paraffin product purity as well as the separation factor would be lower than an all-vapor process. As used herein, the expression "dew point" is the temperature at which the first liquid drop appears from a vapor as the latter is cooled at a particular pressure. For example, based on a particular gas oil composition with hydrocarbons having between 16 and 20 carbon atoms per molecule, the dew point at 15 p.s.i.a. is 594° F. and at 55 p.s.i.a. is 723° F. The dew point of a particular mixture rises with increasing pressure.

It has been discovered that operation above the dew point temperature is not sufficient to avoid a two-phase system in the adsorbent beds. This is due to the surface tension phenomenon of capillary condensation. The latter occurs in the process of this invention when the ratio of feed saturation pressure (dew point pressure) to operating pressure is approximately 2 or less. For example, one gas oil feedstock having a dew point of 670° F. at a typical operating pressure of 25 p.s.i.a. should be contacted with a molecular sieve adsorbent at about 730° F. to avoid capillary condensation. However, as previously discussed, this temperature results in excessive cracking of the vapor feed and deactivation of the molecular sieve due to coke formation.

This problem has been obviated by the introduction of normal hexane purge gas in sufficient quantity with the gas oil-containing feed to lower the resulting mixture's dew point and avoid capillary condensation at the desired operating pressure, and permit operation at temperature below 700° F. Since the adsorbent already contains normal hexane from the previous purge step, the normal hexane introduced in the feed is discharged from the bed with the unadsorbed non-normal hydrocarbons and the previously adsorbed hexane. This first effluent is fractionated in the previously described manner and the normal hexane overhead fraction recycled for use as the purge or for mixing with the feed.

Description of the preferred embodiment

Figure 1:
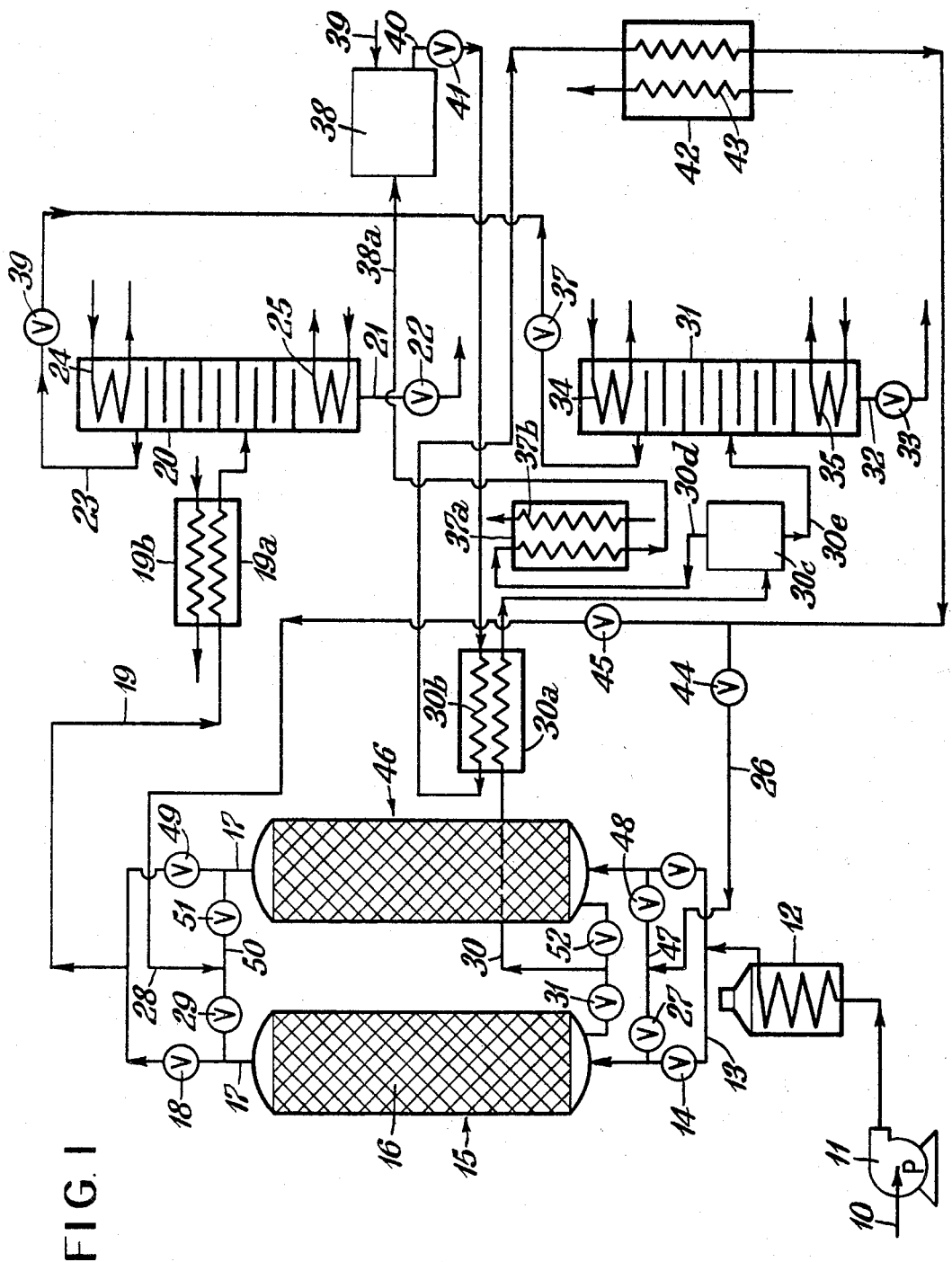
FIG. 1 is a schematic flowsheet of apparatus suitable for practicing the inventive process with two adsorbent beds operating in parallel flow relation.

The hydrocarbon feed stock enters the system through conduit 10 and is pumped to 65 p.s.i.a. by pump 11, heated to 600° F. in heater 12 and passed through connecting conduit 13 and inlet control valve 14 to first adsorbent chamber 15 which contains calcium zeolite A in the form of ⅛-inch pellets 16. In the event that normal hexane dilution of the feed is practiced, the diluent may be diverted from the purge recycle conduit 26 by a valve-controlled conduit (not illustrated). Alternatively the normal hexane diluent may be supplied from an external source along with the gas oil-containing feed to conduit 10.

The vapor mixture is passed upwardly through the molecular sieve bed at about 30 p.s.i.a. as the adsorption step. During this step normal paraffins are selectively adsorbed and a normal paraffin adsorption front is formed near the inlet lower end. As adsorption continues the front moves upwardly, displacing the less strongly held n-hexane purge component. Also a portion of the non-internally adsorbed molecules from the feed, that is the cyclic and branch chain hydrocarbons, are discharged through the upper end of chamber 15 into conduit 17 as the first effluent. The latter also contains the progressively displaced, readsorbed and redisplaced normal hexane purge component and any normal hexane introduced in the hydrocarbon feed. It should be appreciated that the normal paraffin adsorption front actually consists of many individual fronts, each due to the particular molecule's adsorptivity on the molecular sieve. For normal paraffins, the molecules containing the lowest number of carbon atoms will be the least strongly adsorbed and thus such molecules will be the leading front in the bed. After a predetermined time, as for example 5 minutes, that is, preferably when this leading adsorption front has reached a predetermined point within the bed 15, the hydrocarbon feed stream flow is terminated by closing inlet valve 14.

The first effluent containing about 20% n-hexane from first chamber 15 in conduit 17 is directed through control valve 18 to joining conduit 19. To facilitate fractional condensation the first effluent is cooled to about 380° F. by passage through heat exchanger 19a with a coolant such as the hydrocarbon feed flowing through passageway 19b. The cooled first effluent is directed to non-straights dehexanizer column 20 at about 35 p.s.i.a. where the non-straights are separated and withdrawn as a liquid bottoms product through conduit 21 having control valve 22 therein. The n-hexane is discharged as an overhead fraction into conduit 23. Dehexanizer 20 includes a distillation column with a sufficient number of theoretical plates so that the n-hexane appears in the overhead, and the bottoms are free of n-hexane as needed to meet a particular non-normal hydrocarbon product specification. Dehexanizer 20 also includes a reflux condenser 24 with circulating cold water in the top, and a steam reboiler 25 in the bottom so that the recycling n-hexane in overhead conduit 23 is in the liquid state. Alternatively the reflux condenser 24 may be deleted and the n-hexane recirculated as a vapor.

Returning now to the over-all process, after completion of the adsorption step, n-hexane purge vapor is preferably introduced through conduit 26 and control valve 27 therein to the inlet bottom end of first chamber 15 for upward flow therethrough in the same direction or concurrent with the previously flowing hydrocarbon feed vapor. This cocurrently flowing purge vapor is of course capable of being internally adsorbed, and effectively removes the non-internally sorbed molecules (non-normals) remaining in the bed and the feed vapor remaining in the non-selective areas of the bed after adsorption. The cocurrently flowing n-hexane purge vapor is passed through first chamber 15 at the adsorption step temperature and pressure. Cocurrent flow is necessary to sweep out the void space vapor which contains the highest concentration of non-adsorbable components at the upper or effluent end of the bed. One advantage of employing substantially the same pressure for cocurrent purging as for adsorption instead of a lower pressure is that the purge desorption of adsorbed normals is minimized. For best results the cocurrent purge vapor flow should be continued at least until the purge vapor appears in the first effluent at substantially the same partial pressure as it is fed into the inlet end. Substantially isothermal or adiabatic adsorption-purging operation also avoids irreversible heat losses and minimizes power costs. The broad concept of cocurrent purging is not part of this invention, but is claimed in copending application Ser. No. 221,033 filed Sept. 4, 1962, and issued as U.S. Patent No. 3,176,444 in the name of K. Kiyonaga.

On completion of the cocurrent purge step, n-hexane purge vapor is introduced through conduit 28 and control valve 29 therein to the upper end of first chamber 15 at substantially the adsorption step temperature and pressure for countercurrent flow therethrough. This purge vapor desorbs the normal hydrocarbon adsorbate from the molecular sieve bed, and the resulting mixture is discharged from the lower end through conduit 30 having control valve 31 therein. Countercurrent purging for desorption of the adsorbate is used because the heaviest (highest molecular weight) normal hydrocarbons adsorbed are more concentrated near the feed inlet lower end of the bed. By employing countercurrent flow they are subjected to the purging influence of both the purge vapor itself plus that of the lighter hydrocarbons desorbed from the upper end of the bed.

The second effluent in conduit 30 containing about 80% n-hexane is cooled from 600° F. to about 200° F. in heat exchanger 30a by liquid n-hexane in passageway 30b, and then directed to phase separator vessel 30c. Substantially pure n-hexane vapor is vented through conduit 30d and the remaining normal paraffin-hexane liquid mixture is directed through conduit 30e to the straights dehexanizer column 31 at about 35 p.s.i.a. The aforedescribed cooling and phase separation steps facilitate separation of the n-hexane and normal paraffins by fractional condensation, and reduce the quantity of n-hexane processed in the dehexanizer column. In column 31 the vapor mixture is separated into a normal paraffin bottoms component which is withdrawn through conduit 32 having control valve 33 therein, and a n-hexane overhead component. Straights dehexanizer column 31 operates similarly to non-straights dehexanizer column 20, having reflux condenser 34 with circulating cold water in the top and steam reboiler 35 in the lower end being separated by an appropriate number of theoretical plates.

The n-hexane overhead liquid fraction from the straights dehexanizer column 31 is transferred through conduit 36 with control valve 37 therein to storage vessel 38 along with the n-hexane overhead liquid fraction from the non-straights dehexanizer column 20 (through conduit 23 having control valve 39 therein). The n-hexane vented from phase separator 30c through conduit 30d is condensed in heat exchanger 37a by a colder fluid such as water in passageway 37b. The resulting liquid n-hexane is then transferred to storage vessel 38 through conduit 38a.

Any makeup n-hexane liquid needed for the process may be introduced to storage vessel 38 from an external source through conduit 39. The n-hexane required for purging is withdrawn from vessel 38 through conduit 40 having control valve 41 therein, warmed by the second effluent in passageway 30b of heat exchanger 30a, vaporized in heat exchanger 42 by a suitable heating fluid such as steam in passageway 43 and heated to the adsorption step temperature. The resulting hot n-hexane vapor is then recycled through conduit 26 and control valve 44 during the appropriate period as the cocurrently flowing purge vapor entering first molecular sieve adsorbent chamber 15 immediately following the adsorption step. Also, the hot n-hexane vapor discharged from heat exchanger 42 is directed through conduit 28 and control valve 45 therein during the appropriate period for countercurrent purging of first chamber 15, thereby desorbing the straights adsorbate in the previously described manner.

Although the process has been specifically described in terms of sequential adsorption, cocurrent purging and countercurrent description of first chamber 15, it will be apparent to those skilled in the art that second chamber 46 is also filled with calcium zeolite A pellets and is piped in parallel flow relation with first chamber 15. With only one adsorbent chamber the normal paraffin and non-normal hydrocarbon products can only be produced intermittently whereas most commercial systems require continuous production. For this reason at least two adsorbent beds are usually employed so that while one bed is on the adsorption step, the other bed is being prepared for reuse by cocurrent purging (if employed) and countercurrent desorption. It may also be desirable in some systems to employ three adsorbent beds piped in parallel so that each bed is on one of the aforementioned process steps at any given moment. This permits continuous production of both products with the three steps.

Referring more specifically to FIG. 1, while first chamber 15 is on the adsorption step, second bed 46 may be first cocurrently purged by introducing hot-n-hexane through conduit 26 to connecting conduit 47 having control valve 48 therein and thence to the feed inlet lower end of the bed. The first effluent comprising non-normals and n-hexane purge is discharged from the upper end of second bed 46 into conduit 17 and passed through control valve 49 to connecting conduit 19 for processing in nonstraights dehexanizer column 20 in the previously described manner. On completion of the cocurrent purge step, valve 44 is closed, valve 45 is opened and the hot n-hexane vapor is recycled through connecting conduit 50 having control valve 51 therein to the upper end of second chamber 46. This vapor flows countercurrently through chamber 46 at the adsorption temperature and pressure, and desorbs the normal paraffin adsorbate. The resulting second effluent is discharged through the bottom end of second chamber 46 into conduit 30 having control valve 52 therein, and passed to straights dehexanizer column 31 for processing as described previously. The flows between first and second adsorbent chambers are switched at the appropriate times in a manner well-known to those skilled in the art.

In one specific system employing the process of this invention, 38,000 pounds per hour of kerosene feed stock with an ASTM initial boiling point of about 300° F. and a ASTM final boiling point of about 485° F. are consecutively passed through three beds each containing about 60,800 pounds of calcium zeolite A pellets. The cycle time is 5 minutes for each of the three steps of adsorption, cocurrent purging and countercurrent desorption. During cocurrent purge, the n-hexane flow rate is 5,500 pounds per hour and during countercurrent purge the n-hexane flow rate is 67,000 pounds per hour.

Figure 2:
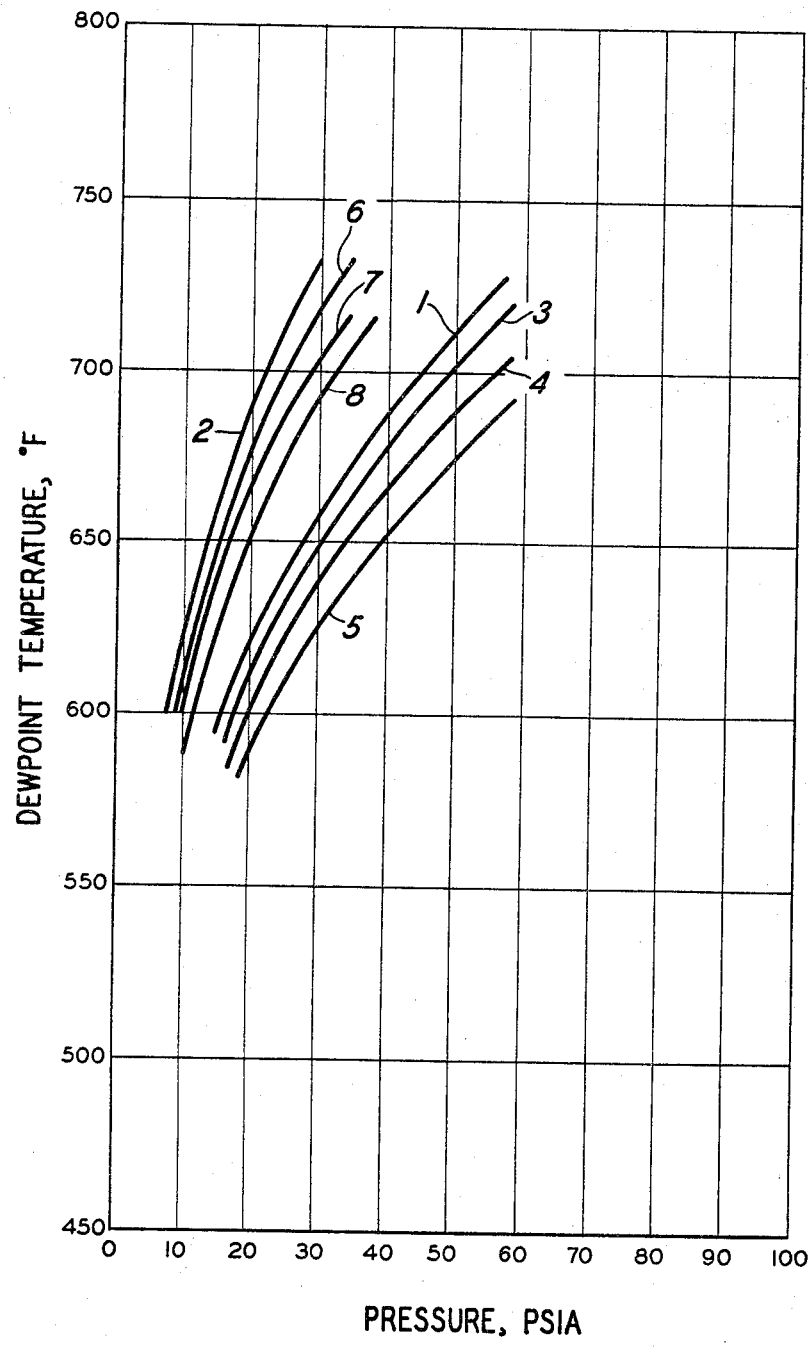
FIG. 2 is a graph showing the relation between dew point and capillary condensation points for a particular gas oil plotted as the ordinate against operating pressures as the abscissa.

The procedure for determining the amount of normal hexane dilution of the gas oil-containing feed will be understood from the ensuing discussion and FIG. 2.

From the composition of the gas oil, one may first establish a dew point-pressure curve using pure component vapor pressure curves from literature sources. This curve is shown in FIG. 2 for a gas oil having the following composition:

|  | Wt. percent | Mol percent |
| --- | --- | --- |
| $C_{16}$ | 21.9 | 23.9 |
| $C_{17}$ | 33.7 | 34.6 |
| $C_{18}$ | 18.4 | 17.9 |
| $C_{19}$ | 17.6 | 16.2 |
| $C_{20}$ | 8.4 | 7.4 |

The next step is to determine a capillary condensation curve using the previously discussed relation of dew point pressure/operating pressure=2. The position at a given dew point temperature on the capillary condensation curve is found by dividing the operating pressure on the dew point curve by 2. For example, at 660° F. the dew point pressure is 30 p.s.i.a. whereas the capillary pressure is 15 p.s.i.a. It will be apparent from the resulting capillary condensation curve that in the preferred pressure range of 25-30 p.s.i.a. and without n-hexane dilution of feed, one must employ process temperatures of about 710–730° F. to avoid condensation and resultant loss of purity. However, this would exceed the 700° F. preferred limit to avoid cracking and molecular sieve deactivation.

New dew point and capillary condensation curves may then be determined in the same manner using various percentages of normal hexane dilution of the gas oil feed.

The resulting curves are numbered as follows for identification:

Curve:
1 ----- Pure gas oil dew point.
2 ----- Pure gas oil capillary condensation.
3 ----- 10 mol percent $nC_6$ dew point.
4 ----- 20 mol percent $nC_6$ dew point.
5 ----- 30 mol percent $nC_6$ dew point.
6 ----- 10 mol percent $nC_6$ capillary condensation.
7 ----- 20 mol percent $nC_6$ capillary condensation.
8 ----- 30 mol percent $nC_6$ capillary condensation.

Inspection and comparison of these curves in the preferred 25-30 p.s.i.a. range indicates that one may operate at about 690° F. and 25 p.s.i.a. using 20 mol percent normal hexane dilution of the gas oil feed (curves 4 and 7). In this manner, capillary condensation is avoided and the temperature is kept below the 700° F. upper limit of the preferred range for gas oil-containing feeds.

The advantages of the normal hexane diluted-gas oil feed embodiment of the invention were illustrated in a series of experiments using gas oil having initial and end boiling points of 520° F. and 632° F. respectively, and the following composition:

GAS OIL COMPOSITION

| Number of carbons | Normal paraffin content (wt. percent) | Molecular weight distribution (wt. percent) |
| --- | --- | --- |
| $C_{14}$ | 0.1 | 0.2 |
| $C_{15}$ | 1.6 | 3.6 |
| $C_{16}$ | 4.3 | 12.0 |
| $C_{17}$ | 7.1 | 23.9 |
| $C_{18}$ | 3.0 | 19.6 |
| $C_{19}$ | 3.5 | 18.1 |
| $C_{20}$ | 1.3 | 11.9 |
| $C_{21}$ | 0.7 | 6.8 |
| $C_{22}$ | 0.3 | 2.7 |
| $C_{23}$ | 0.1 | 1.2 |

In these experiments the process steps were adsorption, cocurrent purge with 85% n-hexane, and countercurrent desorption again with n-hexane, all at 690° F. and 25 p.s.i.a. A single calcium zeolite A adsorbent bed weighing 13,950 grams was used with overall dimensions of 3.0 inches diameter and 168.0 inches long. In Run I, the gas oil feed was not diluted with n-hexane whereas 50 mol percent n-hexane and 50 mol percent gas oil mixtures were used in Runs II, III and IV. The difference between the last three runs was the quantity of cocurrent n-hexane purge; Run II employed about the same amount as undiluted gas oil Run I whereas Runs III and IV used only 71% and 37% as much cocurrent n-hexane purge as Run I. The results of Runs I–IV are summarized as follows:

GAS OIL—WITH AND WITHOUT n-HEXANE DILUTION

|  | I | II | III | IV |
| --- | --- | --- | --- | --- |
| No. of cycles | 12 | 38 | 14 | 12 |
| Adsorption: |  |  |  |  |
| Time, min | 6.6 | 6.0 | 6.0 | 6.0 |
| Total feed, g | 1,004 | 1,214 | 1,212 | 1,215 |
| Total $C_{14}^+$, g | 1,004 | 922 | 921 | 923 |
| Cocurrent purge: |  |  |  |  |
| Time, min | 3.1 | 3.3 | 2.3 | 1.2 |
| Total purge, g | 426 | 430 | 304 | 157 |
| Desorption purge: |  |  |  |  |
| Time, min | 11.0 | 10.9 | 10.9 | 10.9 |
| Total purge, g | 4,340 | 4,320 | 4,320 | 4,320 |
| Normals product purity, wt. percent | 95.3 | 97.6 | 97.1 | 97.6 |
| Normals recovery, wt. percent | 95.3 | 95.2 | 100 | 100 |

A comparison of these results indicates that significantly higher normals product purities and recoveries were obtained using n-hexane dilution, even with substantially less cocurrent purge as previously noted.

Although n-hexane is the preferred diluent for gas oil so as to lower the dew point and capillary condensation temperatures, other diluents may be employed. For example, a kerosene fraction may be added to the gas oil and the required quantity determined in the same manner as described in connection with FIG. 2.

Although particular embodiments of this invention have been described in detail, it is contemplated that modifications of the process may be made and that some features may be employed without others, all within the scope of the invention. For example, it is not essential that the normal hexane overhead fractions from columns 20 and 31 be mixed and stored in vessel 38; storage may not be necessary in some embodiments. Moreover, one need not mix the two streams prior to recycling as the purge fluid.

The adsorbent used in this invention, zeolitic molecular sieves, are three-dimensional crystalline metal aluminosilicates having the basic formula:

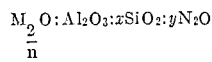

where M represents an exchangeable cation and $n$ its valence. In general, a particular crystalline zeolite will have values for $x$ and $y$ that fall within a definite range.

Zeolitic molecular sieves have pore openings of uniform dimensions as contrasted with conventional adsorbents. For the present invention the molecular sieve must have an apparent pore size of about 5 angstroms—large enough to admit normal paraffins but too small for the non-straight chain hydrocarbon to pass into the inner cagework for adsorption. Thus the molecular sieve selectively adsorbs normal paraffins from the hydrocarbon vapor feed and rejects the larger non-straight chain hydrocarbon components of the feed.

Among the naturally occurring molecular sieves suitable for practicing this invention are erionite calcium-rich chabazite and certain forms of mordenite. These materials are adequately described in the chemical art. Suitable synthetic zeolitic molecular sieves include zeolites D, R, S, T and divalent metal cation-exchanged forms of zeolite A as exemplified by calcium zeolite A.

Zeolite A is a crystalline molecular sieve which may be represented by the formula:

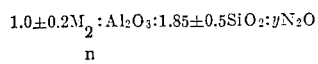

wherein M represents a metal, $n$ is a valence of M, and $y$ may have any value up to about 6. The as-synthesized zeolite A contains primarily sodium ions and is designated sodium zeolite A. Calcium zeolite A, the preferred molecular sieve, is a derivative of sodium zeolite A in which about 40 percent or more of the exchangeable sodium cations have been replaced by calcium. Similarly, strontium zeolite A and magnesium zeolite A are derivatives of sodium zeolite A wherein about 40 percent or more of the exchangeable sodium ions have been replaced by the strontium or magnesium ions. Zeolite A is described in more detail in U.S. Patent No. 2,882,243 issued Apr. 14, 1959.

Zeolite D is a crystalline zeolitic molecular sieve which is synthesized from an aqueous aluminosilicate solution containing a mixture of both sodium and potassium cations. In the as-synthesized state, zeolite D has the chemical formula:

$$0.9 \pm 0.2[x\text{Na}_2\text{O}:(1-x)\text{K}_2\text{O}]:\text{Al}_3\text{O}_3:w\text{SiO}_2:y\text{H}_2\text{O}$$

wherein $x$ is a value from zero to 1, $w$ is from about 4.5 to 4.9 and $y$ in the fully hydrated form is about 7. Further characterization of zeolite D by means of X-ray diffraction techniques is described in copending application Ser. No. 690,383, filed Aug. 26, 1957. The preparative conditions for zeolite D and its ion-exchanged derivatives and their molecular sieving properties are also described therein.

Zeolite R is described and claimed in U.S. Patent No. 3,030,818 issued Apr. 17, 1962.

Zeolite S is described and claimed in U.S. Patent No. 3,054,657 issued Sept. 18, 1962.

Zeolite T is a synthetic crystalline zeolitic molecular sieve whose composition may be expressed in terms of oxide mole ratios, as follows:

$$1.1 \pm 0.4[x\text{Na}_2\text{O}:(1-x)\text{K}_2\text{O}]:\text{Al}_2\text{O}_3:6.9 \pm 0.5\text{SiO}_2yH_2O$$

wherein $x$ is any value from about 0.1 to about 0.8 and $y$ is any value from about zero to about 8. Further characterization of zeolite T by means of X-ray diffraction techniques is described in U.S. Patent No. 2,950,952 issued Aug. 30, 1960.

What is claimed is:

1. A process for separating normal paraffins from a hydrocarbon vapor feed stream containing between about 10 and 40 mol percent normal paraffins having 10 to 25 carbon atoms per molecule and non-normal hydrocarbons which comprises the steps of contacting said hydrocarbon vapor feed stream with one end of a bed of zeolitic molecular sieve having pore size of about 5 angstroms at temperature of between about 500° F. and 800° F. and at superatmospheric pressure between about 20 and 65 p.s.i.a. thereby adsorbing said normal paraffins in said bed and withdrawing a first effluent stream substantially depleted of said normal paraffins but containing normal hexane purge fraction at said superatomspheric pressure, said normal hexane purge fraction having been introduced in said bed in a previous purge step; terminating the feed stream-molecular sieve contact and passing normal hexane purge vapor at said superatmospheric pressure and the adsorption temperature through said bed in a direction countercurrent to the previously flowing hydrocarbon vapor feed and discharging therefrom a second effluent of desorbed normal paraffins and the normal hexane purge; fractionating the first effluent mixture into a non-normal hydrocarbon bottoms fraction and a normal hexane overhead fraction; fractionating the second effluent into a normal paraffin bottoms fraction and a normal hexane overhead fraction; recycling both of said normal hexane overhead fractions as at least part of said normal hexane purge vapor.

2. A process according to claim 1 in which the hydrocarbon vapor feed stream-molecular sieve contact is continued until the leading normal paraffin front reaches a predetermined location within the bed, normal hexane purge vapor is flowed through the molecular sieve bed in a direction cocurrent to the feed vapor flow but subsequent to said feed vapor flow and prior to the countercurrent normal hexane purge vapor step.

3. A process according to claim 1 in which kerosene having 10 to 15 carbon atoms per molecule is the hydrocarbon vapor feed and the adsorption-desorption temperature is between about 575 and 675° F.

4. A process according to claim 1 in which kerosene having 10 to 15 carbon atoms per molecule is the hydrocarbon vapor feed and the adsorption-desorption temperature is between 600 and 635° F.

5. A process according to claim 1 in which gas oil having 16 to 25 carbon atoms per molecule is the hydrocarbon vapor feed and the adsorption-desorption temperature is between about 600 and 700° F.

6. A process according to claim 1 in which gas oil having 16 to 25 carbon atoms per molecule and normal hexane comprise said hydrocarbon vapor feed and the adsorption-desorption temperature is between about 600 and 700° F.

References Cited

UNITED STATES PATENTS

| | | | |
|---|---|---|---|
| 3,201,490 | 8/1965 | Lacey et al. | 260—676 |
| 3,291,725 | 12/1966 | Brodbeck | 208—310 |
| 3,309,415 | 3/1967 | Young et al. | 260—676 |
| 3,373,103 | 3/1968 | Cooper et al. | 260—676 |

DELBERT E. GANTZ, *Primary Examiner.*

H. LEVINE, *Assistant Examiner.*